United States Patent [19]

Liebrock

[11] Patent Number: 5,737,623
[45] Date of Patent: Apr. 7, 1998

[54] MULTI-PROCESSOR PARALLEL COMPUTER ARCHITECTURE USING A PARALLEL MACHINE WITH TOPOLOGY-BASED MAPPINGS OF COMPOSITE GRID APPLICATIONS

[76] Inventor: Lorie M. Liebrock, 2315 County Rd., Calument, Mich. 49913

[21] Appl. No.: 423,483

[22] Filed: Apr. 19, 1995

[51] Int. Cl.⁶ .................................................. G06F 17/16
[52] U.S. Cl. ........................................... 395/800; 395/706
[58] Field of Search ................................ 395/800, 705, 395/706, 709

[56] References Cited

U.S. PATENT DOCUMENTS

| | | | |
|---|---|---|---|
| 5,193,190 | 3/1993 | Janczyn | 395/700 |
| 5,450,313 | 9/1995 | Gilbert | 364/133 |
| 5,475,856 | 12/1995 | Kogge | 395/800 |
| 5,551,039 | 8/1996 | Weinberg | 395/700 |
| 5,586,325 | 12/1996 | MacDonald | 395/706 |

OTHER PUBLICATIONS

*Using Problem Topology In Parallelization* by Liebrock, L.M. Thesis for Doctor of Philosophy, Rice University, Sep. 1994.

"A Partitioning Algorithm for Composite Grids" by Michael Thuné, Parallel Algorithms and Applications, Gordon and Breach Science Publishers S.A., vol. 1, No. 1.

*Primary Examiner*—Eric Coleman
*Attorney, Agent, or Firm*—Lowe, Price, LeBlanc & Becker

[57] ABSTRACT

A parallelization process for complex-topology applications is based on an understanding of topology and includes two separate parts: i) an automatic, topology-based data distribution method and ii) a program transformation method. Together these methods eliminate the need for user determined data distribution specification in data layout languages such as High Performance Fortran. The topology-based data distribution method uses both problem and machine topology to determine a data-to-processor mapping for composite grid applications. The program transformation method incorporates statements in the user program to read and implement the data layout determined by the distribution method and to eliminate the need for user development and support of subroutine clones for data distribution.

35 Claims, 9 Drawing Sheets

MULTI-PROCESSOR PARALLEL COMPUTER ARCHITECTURE USING A PARALLEL MACHINE WITH TOPOLOGY-BASED MAPPINGS OF COMPOSITE GRID APPLICATIONS

This invention was made with U.S. Government support, and the U.S. Government has certain rights in the invention. In particular, this invention was made under the following government agencies and grant numbers:

(1) Office of Naval Research: M00014-93-1-0158
(2) National Science Foundation: ASC-9213821.

FIELD OF THE INVENTION

This invention relates to the parallelization of complex topology or composite grid applications, and particularly to determining and using data distributions for parallelization of composite grid applications with data layout languages such as High Performance Fortran.

BACKGROUND OF THE RELATED ART

The parallelization of many applications has been simplified with the advent of data layout languages. When writing a parallel program using a data layout language, the programmer specifies how the program data is mapped to the parallel processors. Given this data mapping, or distribution specification, the compiler handles many of the tedious chores associated with previous approaches to parallel programming—data declaration modification, loop-bounds updates, and explicit communication generation. If the data mapping is regular, the compiler may be able to apply many optimizations. However, it has been discovered that when the data mapping is not regular, the traditional optimizations are not valid.

The determination of efficient data layout is recognized as the most difficult part of the parallel programming process, once a parallel algorithm has been developed. Data layout is challenging even for standard single large mesh problems.

In some complex topology, or composite grid applications, the space for each component of a simulation is represented by a different mesh, e.g., the pipes, pumps, tanks, in a water-cooled nuclear reactor simulation. In other composite grid applications, the space surrounding a body with a complicated topological structure is represented by multiple overlapping or adjoining meshes, e.g., the wings, pylons, engines, in a aerodynamic simulation for an aircraft. In both types of applications, it has been discovered that the meshes are computationally coupled together at the overlaps, or joints which needs to be considered to properly simulate the entire physical space for the simulation.

The use of many coupled meshes in composite grid applications makes finding an efficient data layout even more difficult than it is for single mesh problems. In the composite grid case, all of the meshes are coupled together. If the meshes are placed on different processors, communication will be necessary. It has been discovered that achieving load balance without causing high levels of communication is a problem.

A further difficulty, associated with composite grid applications, has been discovered. In complex topology simulations, the programs normally read the problem topology as part of the input. For this reason, the data distribution specification changes with each new input file. It has been discovered that it is undesirable, in this case, to have explicit data distribution in the user program. For the data distribution to be read as part of the input along with the problem topology, every possible data distribution, for all types of meshes, must be supported in the application program. It was discovered that, all possible data distributions could be supported by constructing a clone for each possible combination of data distributions and requiring a special form for the program. This approach has advantages and disadvantages. The many clones needed are a disadvantage as they increase storage requirements for the program, compile time for the program, and program maintenance requirements. On the other hand, the clones allow the use of compile-time optimizations and they eliminate the need to recompile for each new data set.

Few prior art attempts have been made to perform composite grid data distribution. For example, in Thune's mathematical approach, only large meshes are considered and only 2-dimensional distributions are generated. The distributions are also generated based primarily on load balancing issues. Furthermore, the distributions generated are not regular. Therefore, the communication is not regular, and therefore, as discussed previously, regular application optimizations can not be applied at compile time. Indeed, Thune does not even address programmability with his approach to data layout. Most importantly, Thune's work handles only very limited problem topologies in which finer resolution grids are superimposed directly over a portion of the main grid to improve solution resolution. Moreover, these restrictions mean Thune's approach is not appropriate for certain applications, e.g., water-cooled nuclear reactor and aerodynamic simulations. Finally, Thune's work was developed for multi-grid, not general composite grid, applications. The topology-based composite grid data distribution method described herein has none of these shortcomings.

DISCLOSURE OF THE INVENTION

The present invention is directed toward a parallelization system and method for complex-topology applications. It is based on an understanding of topology and comprised of two separate parts: program transformation method and an automatic, topology-based data distribution method. The underlying theme for this invention is the use of topology to simplify the parallelization process for complex topology problems. In the automatic, topology-based data distribution method, the problem and machine topologies are used to determine how to map the problem data onto the machine architecture. Accordingly, the present invention is based, in part, on the discovery that topology may be used to improve the efficacy of parallelization by reducing necessary communication when mapping a composite grid problem to parallel processors.

To further simplify the application program, in conjunction with this mapping, the transformation method eliminates the need for the tedious, error prone, process of having the application programmer generate and maintain clones of subroutines for each valid data distribution.

Part of the information needed by the topology-based data distribution method rests on an understanding of the computation associated with each mesh in the simulation. This information may be obtained from the application programmer, the transformation method via an interprocedural analysis, or the compiler via an interprocedural analysis during the compilation of the parallel program resulting from the transformation method.

BRIEF DESCRIPTION OF DRAWINGS

The invention will be more fully understood with reference to the accompanying drawings.

DETAILED DESCRIPTION OF THE PREFERRED EMBODIMENTS

Table of Contents
1. Environment
2. Overview of Problem and Machine Topology Description
3. Mesh Classification
4. Medium Size Mesh Packing
   a. Overview
   b. Packing via Nonlinear Optimization
   c. Packing via Local Linear Optimization
   d. Packing via Heuristics
   e. Generation of Large Meshes
   f. Update Couplings for New Large Meshes
5. Large Mesh Distribution
   a. Overview
   b. Processor Topology Candidate Generation
   c. Table Generation
   d. Global Runtime Minimization
   e. Coupling Communication Reduction
6. Small Mesh Mapping
   a. Overview
   b. Mapping a Small Mesh onto a Processor
   c. Selecting a Small Mesh
   d. Selecting a Processor
   e. Mapping Filler Meshes
7. Program Transformation
   a. Overview
   b. Target Language Requirements
   c. Application Program Requirements
   d. Modification of User Defined Types(UDTs)
   e. Addition of Distribution Specifications to Input
   f. Modification of Storage Allocation Routines
   g. Addition of Processors Statement
   h. Cloning and Modification of Subroutines with Distributed Data
   i. Modification of Calls to Subroutines with Distributed Data
8. Overview of Machine Use
9. Operation of Invention

1. Environment

Figure 1:
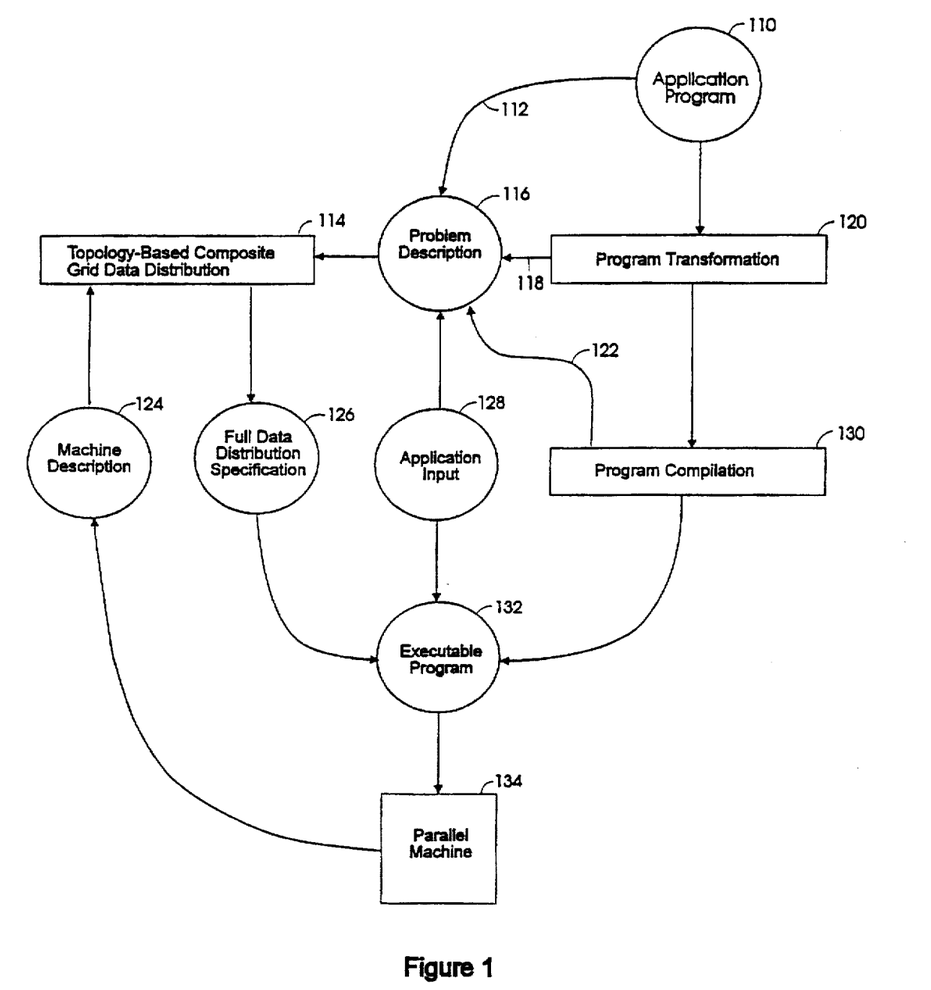
FIG. 1 is a block diagram of the environment in which the invention operates.

The invention is directed toward automating the data layout for the parallelization of composite grid applications. FIG. 1 provides an overview of the operation of the invention. In FIG. 1 the target parallel architecture [134] is software configurable to a number of different topologies. An example of such a configurable architecture is described in U.S. Pat. No. 5,134,690. This invention may be used on restricted topology architectures as well. With restricted topology architectures, there may be no options for target topology and this will restrict the possible mappings, as necessarily it does for any approach.

The environment for these methods uses a high-level data parallel language, where the parallelism in the application can be specified explicitly. To make this discussion concrete, High Performance Fortran is used as representative of such languages.

When the application program [110] is accompanied with computation/communication specifications, the topology-based automatic distribution method [114] can run in parallel with the transformation system [120] and/or the compiler [130].

One important advantage of the separation of distribution determination and program transformation is the program does not need to be modified for new data sets. When a new data set is ready for use, the distribution determination is performed and the result can be used with the previously transformed and compiled program [132]. This is important for commercial application programs.

2. Overview of Problem and Machine Topology Description

The problem topology description [116] consists of:
I. the number of meshes in the problem;
II. for each mesh in the problem
   the number of dimensions in the mesh,
   the number of elements in each dimension of the mesh,
   the amount of communication in each dimension of the mesh; and
   the amount of computation in each element of the mesh;
III. for each coupling between meshes
   identification of the coupled elements;
   the amount of communication between each pair of coupled element; and
IV. the preferred number of processors to use.

Note: part of this information is obtained from the application input file [128], but some of it is obtained directly or indirectly from the application program [110], i.e. the computation and communication measures are generally determined from the application program [110], not the input file [128].

The totality of this information completely specifies the topology of static problems. For dynamic problems, this information must be provided at intervals during the computation and the data must be redistributed accordingly.

The machine topology description [124], provided in a system file, consists of:
I. the maximum number of processors available on the system;
II. the available processor topologies; and
III. measures of the computation and communication rates.

The totality of this information completely specifies the operating parameters of the machine and supports data layout determination. Note: if there are fewer processors available on the target architecture than was requested by the user, the user should be given the options of continuing with a reduced set of processors, aborting the distribution process, or completing the process resulting in a data layout not compatible with the current configuration.

Figure 2:
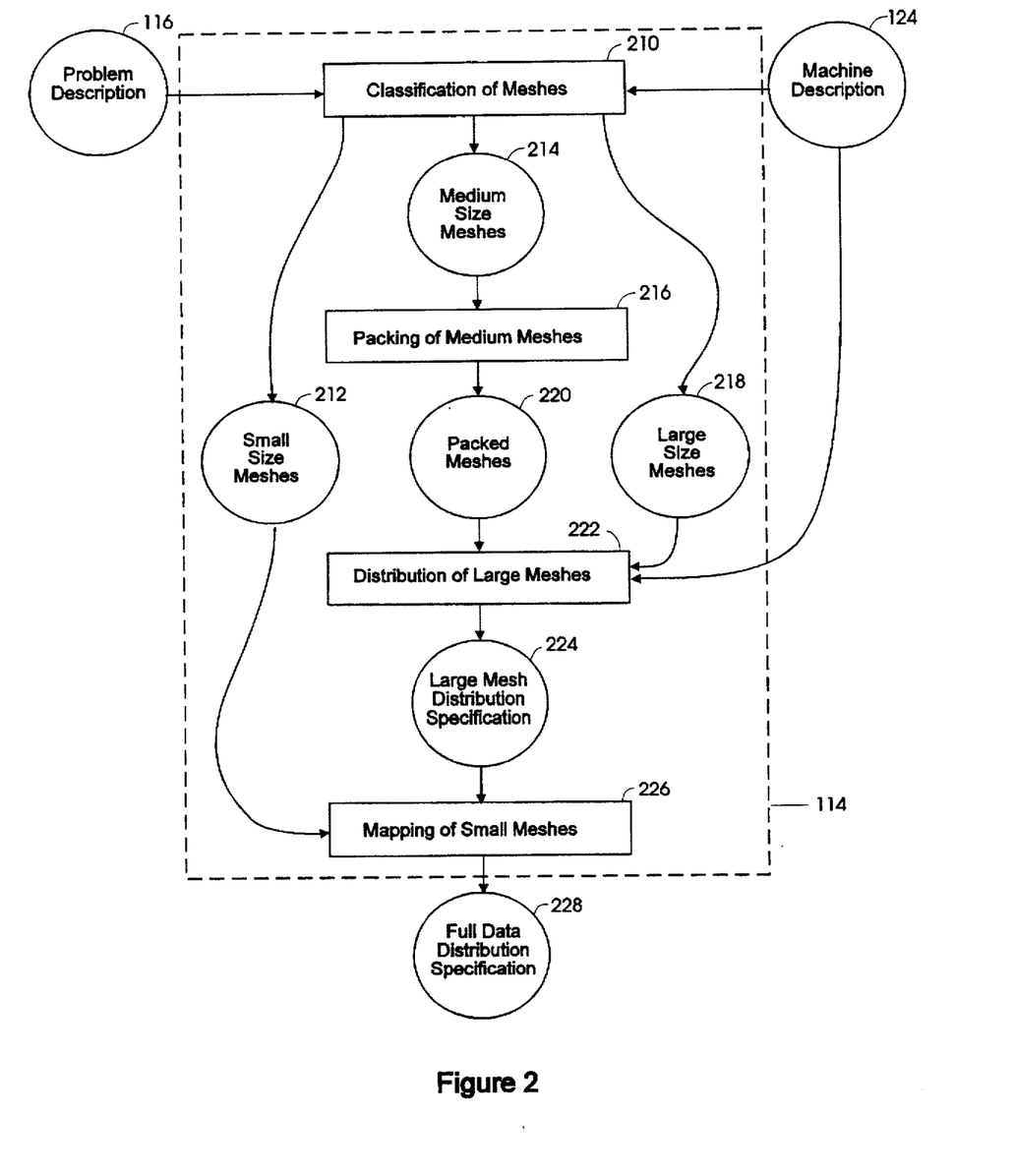
FIG. 2 is a high level flow chart of the topology-based data distribution method for composite grid applications in the environment of FIG. 1.

3. Mesh Classification [210]

Mesh classification consists of the separation of meshes, by size, into three classes: large, small, and medium. Mesh classification is based on the number of processors to be used and the size of the mesh being classified.

A mesh is large [218] if the mesh contains enough elements so the mesh can be reasonably (according to the machine parameters) distributed over all of the processors. Considering only the non-large meshes, the amount of computation that should be assigned to each processor is determined. If a mesh has less than some predetermined fraction of this amount, it is classified as a small mesh [212]. All other meshes are medium size [214].

4. Medium Size Mesh Packing [216]

a. Overview

The need for regular data distribution, to allow compile-time optimizations, combined with load balancing requirements leads to the use of problem topology to pack medium size meshes. The medium size meshes [214] are packed together to form large meshes [220], which can be regularly distributed over all processors.

The mesh packing method must respect the topology of each mesh being packed. For example, packing a 3-dimensional mesh into a larger 2-dimensional mesh is a violation of the topology of the 3-dimensional mesh. This type of packing is not allowed due to the regular data distribution requirement.

For load balance, it is desirable for the meshes to be packed so there is minimal wasted space in the resulting packed mesh. Packing may also include consideration of the couplings to determine position and layout of the meshes being packed.

Figure 3:
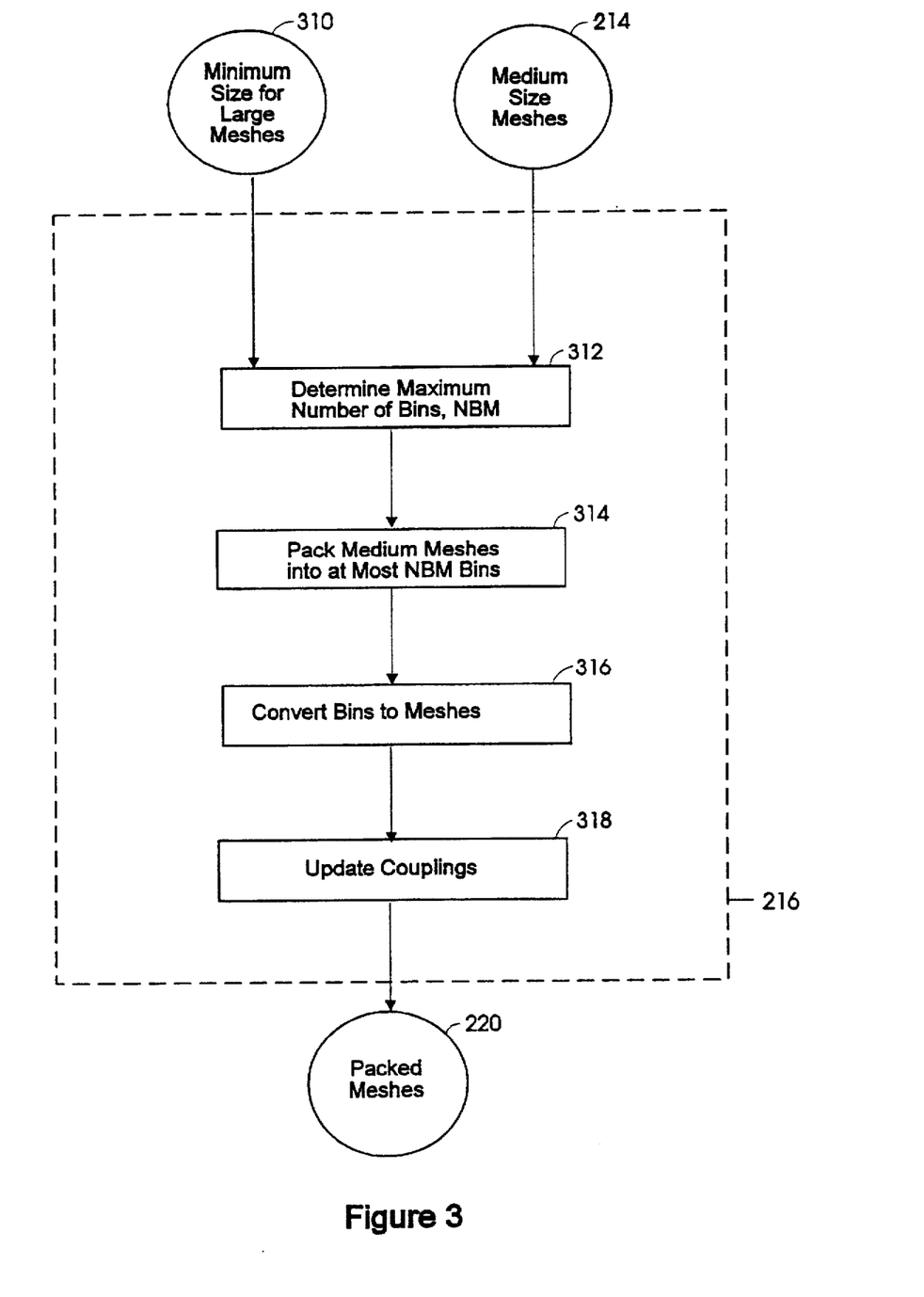
FIG. 3 is a flow chart of the medium mesh packing stage of the method of FIG. 2.

For clarity in the packing method descriptions, the medium size meshes [214] will be packed [314] initially into bins (as in standard bin packing), which will be converted [316] into large meshes after the packing is complete.

FIG. 3 presents a flowchart for the medium size mesh packing process [216]. The process begins by determining [312] how many bins can be used and still have the resulting bins be large enough for distribution over all processors. Next, meshes are packed [314] into bins via nonlinear optimization, local linear optimization, or heuristics. Then the bins are converted [314] into large meshes and finally the couplings are updated [316]. A more detailed description of this packing process is available in a technical report (L. M. Liebrock, "Using Problem Topology in Parallelization", Center for Research in Parallel Computation Technical Report #94-477-S, September 1994, Rice University, for example, pp. 94–102), which is herein incorporated by reference.

b. Packing via Nonlinear Optimization

The nonlinear model of the packing process developed as part of this invention consists of minimization of the total volume of the bins subject to the constraints that: 1) each bin must be at least large enough to distribute over all processors, 2) each mesh must be completely contained inside exactly one bin, 3) no two meshes in the same bin may overlap in space, and 4) each medium mesh has every dimension mapped to one and only one dimension of the bin receiving it. A detailed equational description of this model is available in a technical report (L. M. Liebrock, "Using Problem Topology in Parallelization", Center for Research in Parallel Computation Technical Report #94-477-S, September 1994, Rice University, for example, pp. 96–102), which is herein incorporated by reference.

This nonlinear model may be optimized using any efficient available nonlinear optimization technique.

c. Packing via Local Linear Optimization

The nonlinear model just described is modified to allow the use of linear optimization techniques via the following changes. A local linear approximation to the total volume of the bins is used both in the optimized function and the constraints. Further, the change in bin size in each dimension is limited for every given step of the local linear optimization. With these changes, a local linear model is provided.

This local linear model may be optimized to provide an approximate solution to the nonlinear model, using any available linear optimization technique, by starting with a solution and repeating a local linear optimization until the solution is optimal in the model.

This method is described in detail in the technical report (L. M. Liebrock, "Using Problem Topology in Parallelization", Center for Research in Parallel Computation Technical Report #94-477-S, September 1994, Rice University, for example, pp. 98–102), which is herein incorporated by reference.

d. Packing via Heuristics

Medium size meshes may be packed heuristically rather than using an optimization approach. This normally has the advantage of improved speed but may result in a less than optimal packing.

One heuristic approach begins by packing any two meshes having the same size in all but one dimension. The result of this step of packing is optimal in the sense of minimizing the size of the resulting bin. If the bin is too small for distribution across all processors, it is treated as if it were a medium size mesh in the continuation of the packing process. This is repeated until packing is complete or there are no two bins with at most one dimension differing in size. (An n dimensional mesh can be packed with an n-1 dimensional mesh in this step.) Next, pack any two meshes having different sizes in at most two dimensions. The order for packing: the two packable meshes creating the least wasted space in the resulting bin are packed first. In general, in the ith phase, meshes are considered which differ in size in at most n-i dimensions. During the ith phase, if there are any mesh pairs having fewer than i dimensions with different sizes, the pair of meshes with the fewest number of different dimension sizes are packed first. In addition, when a hole is being created in a packing step, any mesh smaller than the hole can be packed into the hole to reduce wasted space.

An extension of the above heuristic gives preference to meshes of the same shape as the smallest dimensionality large mesh in the original input set of meshes. A better approach to this extension is to determine which processor topology candidate would be selected for the large meshes in the problem and use the shape of the processor topology as the target shape for packed meshes. When there is only one candidate processor topology, its shape is the one to match. The advantage when all of the meshes have the same shape is that they will have similar load balance on each processor topology. If the meshes also have similar communication in dimensions corresponding in shape, then they will perform best on the same processor topology. In this case, there will not be tradeoffs in performance when the processor topology is selected during large mesh distribution.

e. Generation of Large Meshes [316]

After a packing has been found, large meshes are constructed from the bins. For each n-dimensional bin, we create a new n-dimensional large mesh. The size of each dimension of the large mesh is the same as the associated dimension of the bin. The amount of computation for each element of each new large mesh is the same as the amount of computation in the medium size mesh element packed into the corresponding position in the bin. Similarly, the communication for the large mesh is specified by the medium size meshes packed into the bin.

f. Update Couplings for New Large Meshes [318]

Each coupling, involving a medium size mesh, is modified to reflect the communication with the elements in the new large mesh where the medium size mesh has been placed. This completes the full topology and coupling specification for the new large meshes [220]. These new large meshes are added to the pool of large meshes, which will be distributed [222] in the next phase of the process. Distribution specifications are actually generated for the medium size meshes; the new large meshes are just used to determine what the distribution specifications should be.

5. Large Mesh Distribution [222]

a. Overview

Figure 4:
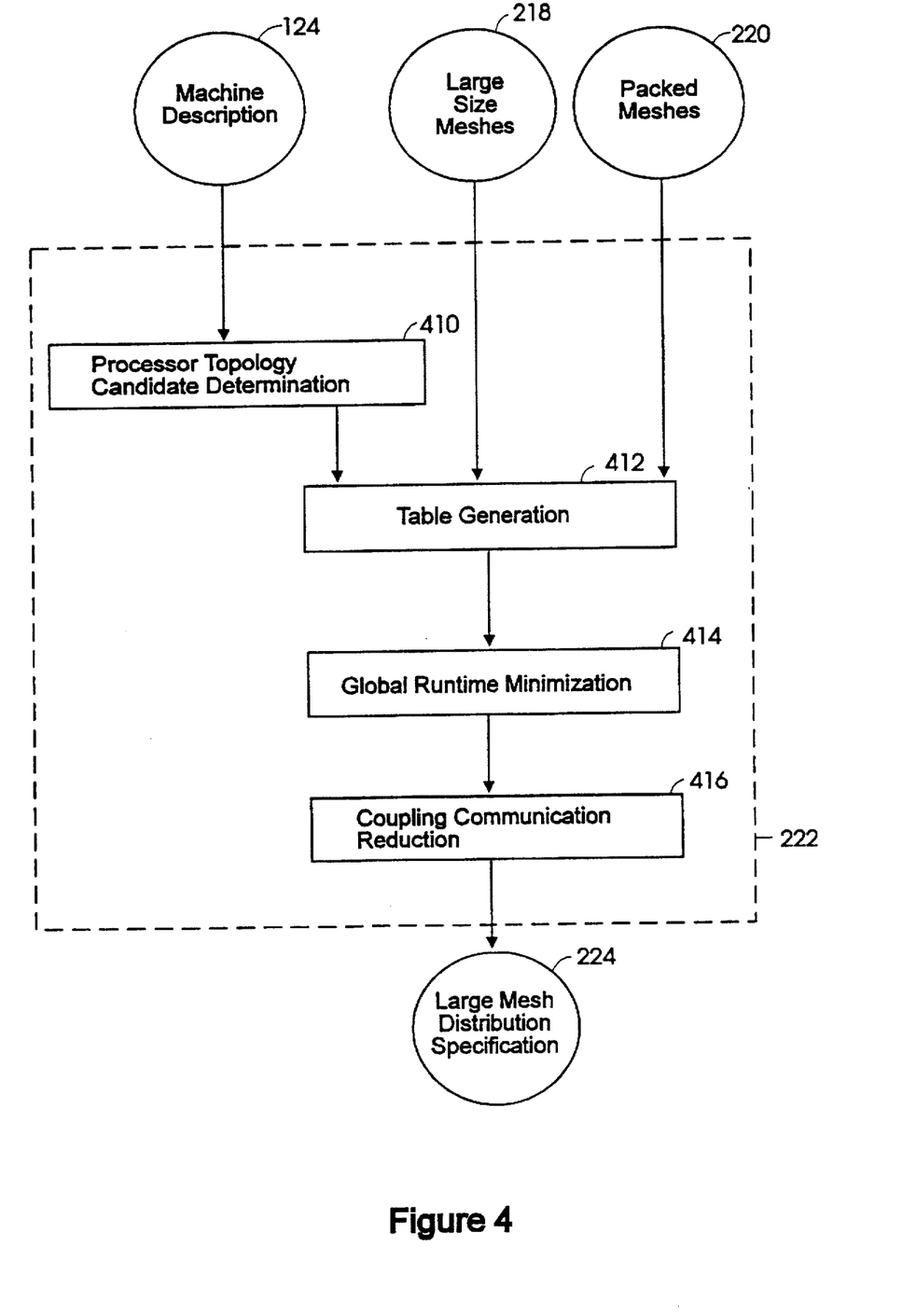
FIG. 4 is a flow chart of the large mesh distribution stage of the method of FIG. 2.

In large mesh distribution, every large mesh (including meshes in both [218] and [220]) is distributed over all of the processors according to its topology. Further, the meshes are aligned relative to each other to reduce the communication implied by the couplings between the meshes. This process of mapping a single mesh over all processors is well known in the art.

b. Processor Topology Candidate Generation [410]

Each large mesh, including those composed of packed medium size meshes [220], will be distributed over all processors in the same processor topology.

If there is only one possibility for processor topology, e.g., a fixed size mesh topology, it will be used. If many topologies are possible, mesh topologies will be selected having as near as possible the same shape as the lowest dimensionality large mesh or most of the large meshes. An alternative approach, which takes longer but can produce better results, is to try every processor array that can be embedded in the target architecture.

All of the processor topologies selected in this step are candidate processor topologies.

c. Table Generation [412]

For each mesh and each candidate processor topology a table entry is created. Each table entry has two parts—the mapping of mesh dimensions to processor dimensions and the predicted execution time of one iteration (timestep) of the simulation for the associated mesh with the given mapping. Each table entry is filled in with these values for the best mapping.

The execution time is predicted with a machine model. The model predicts the computation and communication time for a mesh using the prescribed data distribution, the problem description [116], and the machine description [124]. In the preferred embodiment, this model would be provided by the machine manufacturer. Alternatively, the system administrator or parallel computer consultant could provide this model for use with all applications.

The best mapping of mesh dimensions to processor dimensions may be found by exhaustive search or with the use of heuristics. Sample heuristics include: 1) mapping the highest communication mesh dimension to the processor dimension with the fewest number of processors; 2) mapping the mesh dimension with the fewest number of elements to the processor dimension with the fewest number of elements; and 3) if two mesh dimensions have the same number of elements and the same amount of communication, then they are equivalent and mappings interchanging them do not need to be evaluated.

Table generation is described in detail in the technical report (L. M. Liebrock, "Using Problem Topology in Parallelization", Center for Research in Parallel Computation Technical Report #94-477-S, September 1994, Rice University, for example, pp. 61–64), which is herein incorporated by reference.

d. Global Runtime Minimization [414]

Global runtime minimization involves selecting, from the set of candidates, the processor topology minimizing the total predicted runtime for all meshes.

This step results in dimensional alignment of all large meshes to the selected processor topology.

e. Coupling Communication Reduction [416]

Starting with an arbitrary (or the large mesh with the greatest number of couplings) large mesh, consider the mesh fully mapped; it is aligned to the processor mesh with no offset in any dimension. In maximum coupling cost order (for a coupling between a mapped and an unmapped mesh): 1) If swapping equivalent dimensions in the unmapped mesh will reduce communication cost, then swap them in their dimension mapping. 2) Align the centers of each pair of coupling ranges between the mapped and unmapped meshes, if they are mapped to the same processor dimension. Alignment is done by shifting (and folding) the unmapped mesh around the processor mesh. This results in full distribution specification [224] for all large meshes (both [218] and [220]).

This method is described in greater detail in the technical report (L. M. Liebrock, "Using Problem Topology in Parallelization", Center for Research in Parallel Computation Technical Report #94-477-S, September 1994, Rice University, for example, pp. 65–67), which is herein incorporated by reference.

6. Small Mesh Mapping [226]

a. Overview

In small mesh mapping, the goal is to optimize the load balance on the parallel machine while not incurring extra communication overhead. In particular, the load balance resulting from distribution of large meshes and the couplings between large and small meshes provide the starting point for small mesh mapping. At the end of this phase of the process, full data distribution [228] has been generated for all meshes in the problem.

Figure 5:
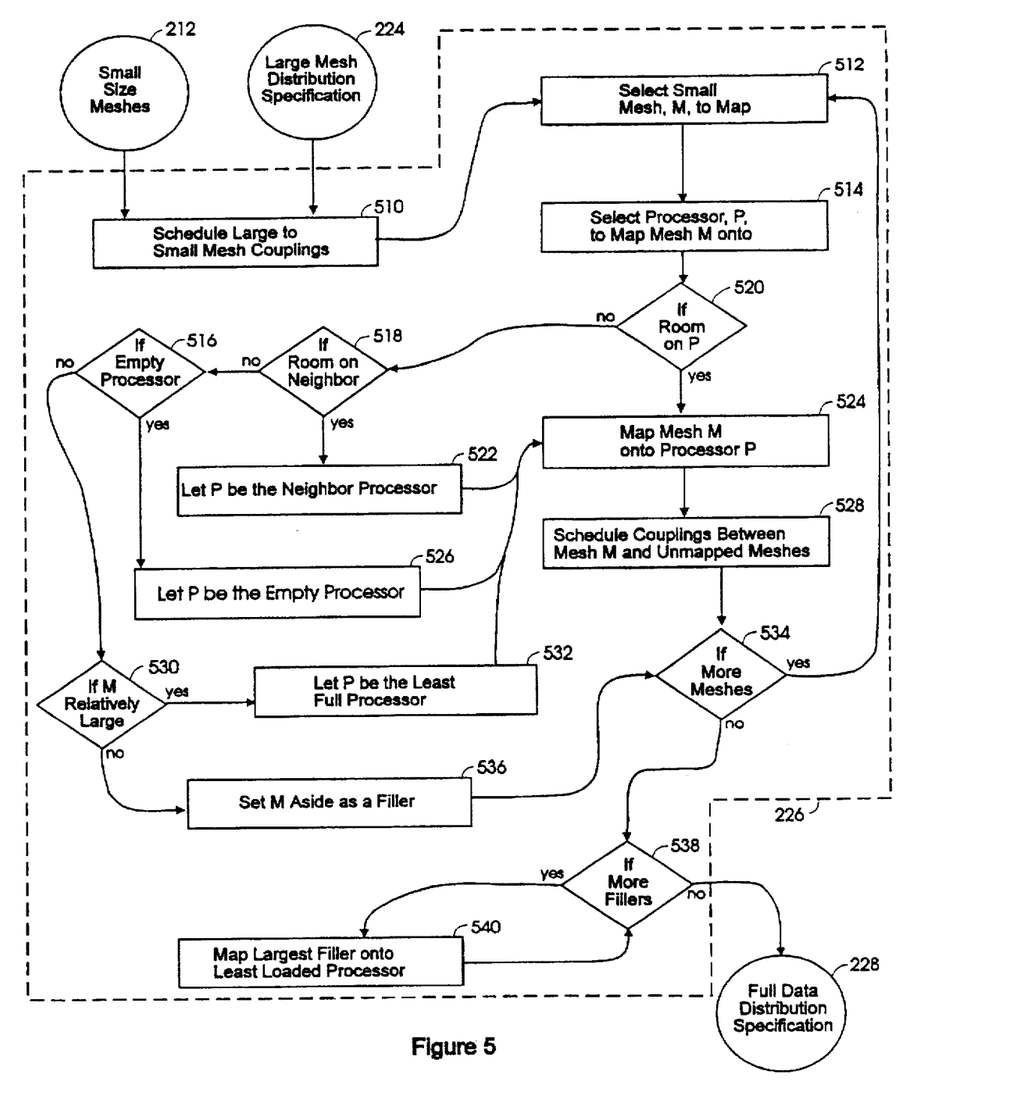
FIG. 5 is a flow chart of the small mesh mapping stage of the method of FIG. 2.

Small mesh mapping is accomplished by repeatedly selecting a small mesh to map [512], finding a processor to place it on, mapping the mesh onto the processor [524], and scheduling the couplings between the mesh and unmapped meshes [528].

This method is described in detail in the technical report (L. M. Liebrock, "Using Problem Topology in Parallelization", Center for Research in Parallel Computation Technical Report #94-477-S, September 1994, Rice University, for example, pp. 80–83), which is herein incorporated by reference.

b. Mapping a Small Mesh onto a Processor [524]

Mapping a small mesh, M, onto a processor, P, involves adding M's computation to the computation assigned to P and scheduling all unscheduled coupling communications involving M.

In one embodiment of the invention, scheduling of coupling communication is handled with the use of two types of heaps—one for the unmapped meshes and another embedded heap for the processors.

A coupling communication involving a newly mapped mesh, M, and an unmapped mesh, N, with communication, W, is scheduled as follows [528]:

if N is not in the mesh heap, then

I. create a processor heap (a standard data structure) for N with or using weight W for processor P, and II. add N to the mesh heap with weight W, otherwise if P is not in N's processor heap I. add an entry for P with weight W to N's processor heap, II. add W to N's weight in the mesh heap and bubble N's entry in the mesh heap (bubble is the term used to describe the heap reordering process necessary to maintain heap order after an element is modified), otherwise, I. add W to P's weight in the processor heap and bubble P's entry in the processor heap, II. add W to N's weight in the mesh heap and bubble N's entry in the mesh heap.

Note: initially the couplings between the large mapped meshes and the small meshes are scheduled.

c. Selecting a Small Mesh [512]

The next small mesh to map at any step of small mesh mapping is the one having the maximum entry in the mesh heap.

When a small mesh is selected to be mapped it is removed from the mesh heap, saving its processor heap for the next phase of small mesh mapping.

d. Selecting a Processor

The target processor for a small mesh should be the maximum one in its processor heap [514]. If the best processor can not accommodate the computation for the small mesh [520], then the small mesh should be mapped to a nearby processor [522] or to some empty processor If there is no acceptable nearby processor [518] and there is no empty processor [516], then the mesh is classified as a filler mesh.

In one embodiment of the invention, any filler mesh having more than a fraction of the amount of computation acceptable for small meshes [530] is mapped to a processor that can accommodate its computation or the processor with the least computation [532]. If the mesh has less than a fraction of the computation acceptable for small meshes, it is saved for load balancing in the final step of small mesh mapping [536].

e. Mapping Filler Meshes

Small filler meshes are sorted in decreasing computation order and processors are sorted in increasing assigned computation order. The filler meshes are mapped to processors by repeatedly mapping [540] the unmapped filler mesh with the most computation onto the processor with the least computation assigned to it.

7. Program Transformation [120]

a. Overview

In an embodiment of the invention, program transformation supports compile-time regular application optimizations without requiring the user or programmer generate and maintain clones of subroutines for each valid data distribution. Accordingly, the compiler performs its optimizations based on interprocedural analysis and symbolic constants.

Alternatively, program transformation is not needed with appropriate runtime communication generation support. In this case, the regular data distributions generated by this invention still allow for some communication optimization.

In some circumstances, the lack of program transformation forces the application programmer to generate and maintain clones of all subroutines for each valid data distribution.

Further details of this process, including sample transformations, can be found in the technical report (L. M. Liebrock, "Using Problem Topology in Parallelization", Center for Research in Parallel Computation Technical Report #94-477-S, September 1994, Rice University, for example, pp. 103–125), which is herein incorporated by reference.

b. Target Language Requirements

Data layout specifications become part of the application program input. This allows the program transformation (and hence compilation) to be done only when changes are made to the program. Further, if separate compilation is available, then the transformation and recompilation need only be applied to changed modules—not the entire application program.

For the data layout specifications to be part of the application program input, it is necessary for the language to support runtime constant specification of the processor topology and mapping of data to processors. High Performance Fortran is one such data layout language.

c. Application Program Requirements

High Performance Fortran is used to show the types of program style restrictions sometimes necessary in data layout languages to support runtime constant processor and data distribution specifications.

In the following application template, the nesting of subroutines and location of the processor declaration are necessary for use of the runtime constants. The use of user defined types(UDTs) is recommended to simplify the analysis needed for program transformation. Further, UDTs simplify the user's view of the application as all data for a single physical component is grouped in one data structure. A sample template for composite grid applications using High Performance Fortran follows.

```
module composite
  C - user defined data types & declarations contains
  subroutine main
    C - calls to storage allocation routines
    C - calls to non-constant input & initialization routines
    C - calls to computation & output routines contains
    C - all subroutines except those for runtime constant inputs
  end subroutine main
  C - subroutine(s) for runtime constant input end module
composite
program icrm
  use module composite
  C - allocation of non-distributed data structures
  C - calls to runtime constant input routines call main( )
end program icrm
```

Figure 6:
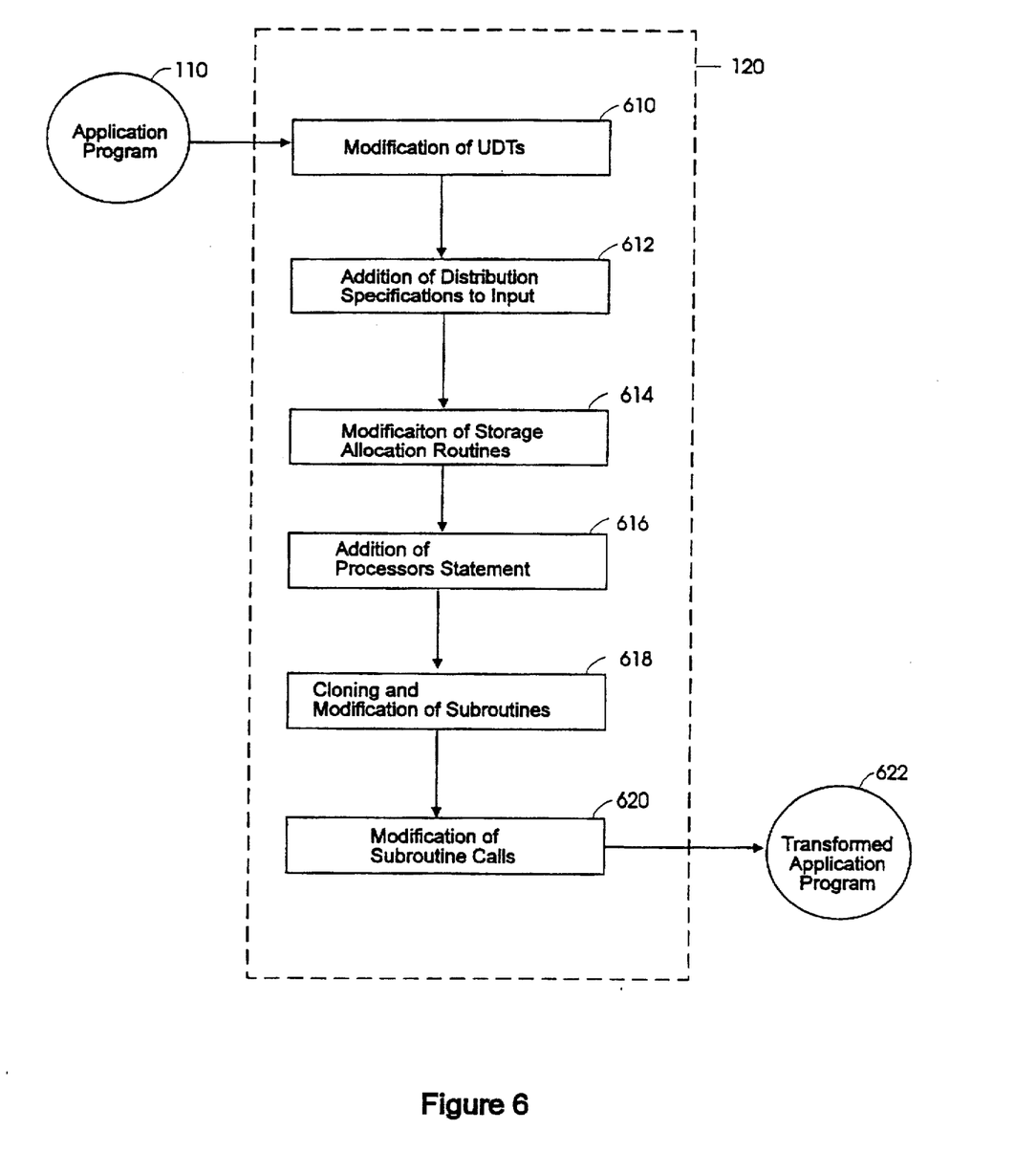
FIG. 6 is a high level flow chart of the application program transformation method for composite grid applications in the environment of FIG. 1.

In the program part of this template, the allocation routines set up the outer level of UDTs. Normally these would be arrays of UDTs with an element for each composite grid. As a part of the runtime constant input, the size of each composite grid is read. The storage for each composite grid is allocated and its data is read via calls inside of subroutine main.

d. Modification of User Defined Types(UDTs) [610]

All of the UDTs containing data to be distributed must be modified to support the distribution of the data structures. This involves addition of data fields. These fields specify the data layout for the UDT arrays representing a specific physical component in the composite grid application. For large and medium size meshes, the dimension alignment and the offset alignment for each dimension must be specified. For small meshes, the processor where mesh is mapped must be specified. Since the classification of each mesh is not known until runtime, each UDT must have storage allocated for both types of specification and a specification, at runtime, as to which type is in use.

e. Addition of Distribution Specifications to Input [612]

The runtime constant input routines are modified to include two new types of input. First, the processor topology is added to the input. Second, for each UDT to have distributed data, the type of distribution must be read before the appropriate distribution specification. All of these runtime constant specifications are obtained from a secondary input file generated by the topology-based distribution method.

f. Modification of Storage Allocation Routines [614]

As the arrays inside of UDTs are to be distributed, the storage allocation routines must be modified. All arrays in a given UDT have the same data distribution, as they all represent different physical or numerical quantities for the same physical component or space in the simulation.

In High Performance Fortran, elements of UDTs can not be distributed directly. To distribute an element (array) of a UDT: 1) the element in the UDT must be a pointer to an array, 2) a temporary array pointer is allocated that is appropriately distributed, 3) the UDT element is set to point to the newly allocated distributed array, and 4) the temporary pointer is nullified (set to point to no storage). To appropriately distribute the temporary array pointer: 1) a template is declared representing the logical topology of the array, 2) the temporary (as yet unallocated) array is aligned with respect to the template, and 3) the template is distributed over the processors.

g. Addition of Processors Statement [616]

In High Performance Fortran, a "processors statement" is added to the main subroutine as the first statement in the routine. The processor topology must be constant upon reaching this statement; this causes the nesting structure required for runtime input of the processor topology.

h. Cloning and Modification of Subroutines with Distributed Data [618]

Each subroutine that has one or more UDT parameters with distributed elements must be modified. These subroutines are cloned and modified for each possible distribution set. Cloning is necessary to express different possible dimension alignments in High Performance Fortran. For example, given two UDTs, with 3-dimensional meshes contained in each, there are 27 different possible combinations of dimension alignment for the data in the two UDTs.

To appropriately specify the distribution of the data: 1) a template (for example, as used in High Performance Fortran) is declared representing the logical topology of the array, 2) each array in a UDT is aligned with respect to the template, and 3) the template is distributed over the processors.

The distribution specifications imply that the data layout information must be added to the subroutine parameter list. Further, because High Performance Fortran does not allow the distribution of elements of UDTs, all of the distributed elements of the UDTs must be passed as explicit parameters. This, in turn, implies that all references to those elements of the UDTs must be replaced with references to the explicit parameters, which at the call site are the elements of the UDTs.

i. Modification of Calls to Subroutines with Distributed Data [620]

Since the called subroutines have had their parameters modified, the calls must be similarly modified.

In addition, since each subroutine has modified clones for each possible data layout, a control structure must be added to select the appropriate clone based on the distribution used for the distributed parameters.

j. Modifications for Dynamic Data Distribution

When data is dynamically redistributed, statistics must be kept for each UDT with distributed data to support topology-based data redistribution determination. The topology-based data distribution method must be applied, using this data, at intervals to obtain new data mappings. Next, the stored distribution specification must be modified to reflect the new data layout. Finally, redistribution statements must be added to the application program to implement the new data layout specifications.

In one embodiment of the invention, the determination of redistribution is implemented to execute on the parallel machine. In this case, the application execution is interrupted by data redistribution determination.

In another embodiment of the invention, the statistics are shipped to a workstation. Redistribution determination is preformed on the workstation, while the application program continues to execute on the parallel machine. In this case, the application is not interrupted until new distribution specifications are ready at which time the application is interrupted to perform data redistribution.

8. Overview of Machine Use

Figure 1A:
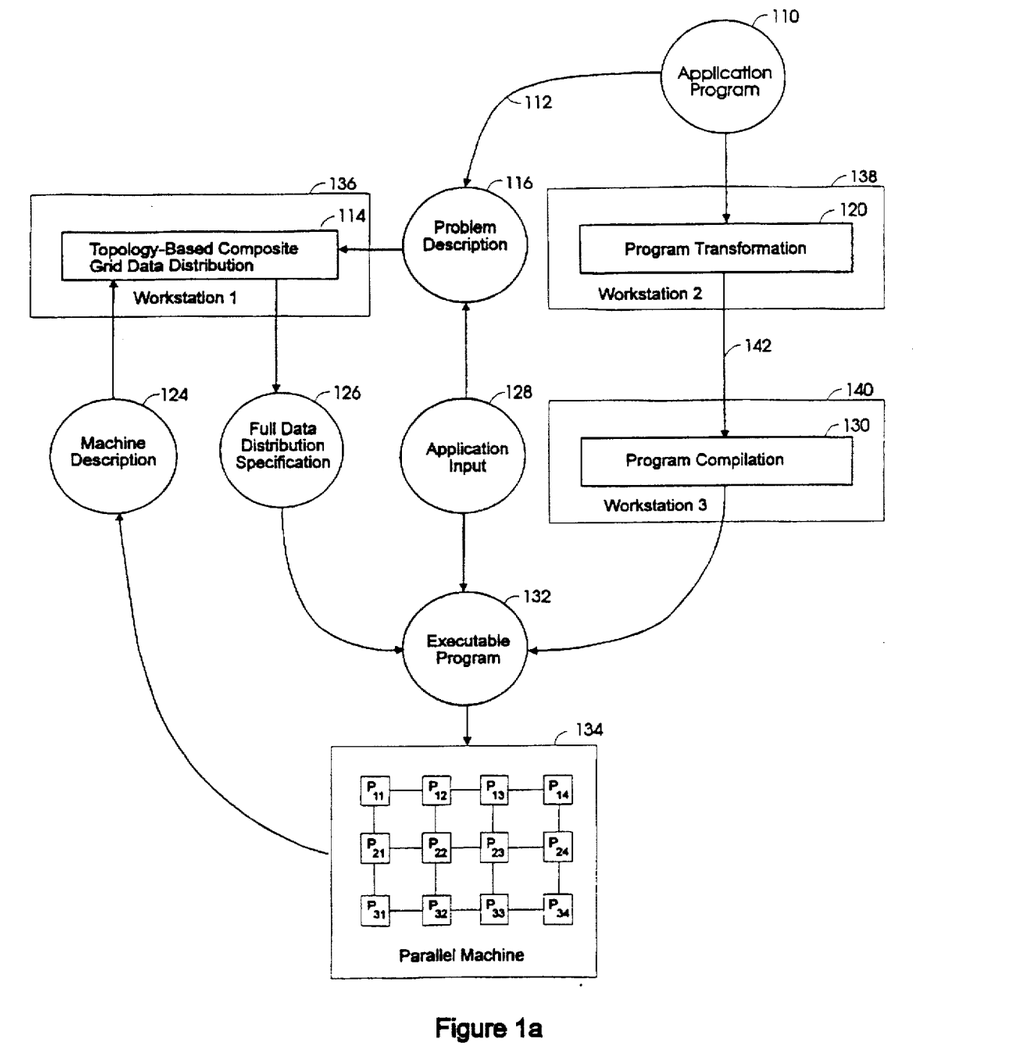
FIG. 1a is a block diagram of the environment in which the invention operates, with the mapping of each phase of the process mapped to a machine, for a specific parallel processor.

When the computation and communication measurements needed for the problem description [116] are provided by the programmer or user [112], parallelism can be utilized in this process. In FIG. 1a, the computation and communication measures are provided with the application program [110]. The measures become part of the problem description [116], which is input to the data distribution method [114]. This implies that the data distribution method [114] and the program transformation method [120] can operate in parallel, for example they may be run on different workstations. Further, if there are program units (subroutines and/or functions) in different files and separate compilation is available, the program files may be pipelined through the program transformation method [120] and the program compilation process [130], which may also be run on different machines.

The program transformation method [120] may be run on a parallel machine. Once the module with the user define types has been processed, each separately compilable file can be transformed in parallel.

Other options for the use of parallelism include the following: 1) Use of multiple processors to perform medium mesh packing with different methods. In this case, the best packing would be chosen for use in data distribution. 2) Use of multiple processors to perform table generation for different large meshes. 3) Use of multiple processors, which communicate, to map different small mesh to the target architecture.

When the application is a commercial product, the company selling it is primarily interested in the transformation and compilation of the program. In this case, a parallel machine can be used by the company to transform the application program in preparation for compilation. At the user site, a parallel machine can be used to find the data distribution and execute the application program with the determined data distribution.

9. Operation of Invention

In FIG. 1, the user or programmer supplies an application program [110] specifying explicitly the parallelism, but not specifying the data layout. The application program, or an associated file, may include the computation and communication measures needed for data distribution. If the measures are not included with the application program, then they must be gathered via interprocedural analysis during either program transformation [120] or program compilation [130].

Program transformation [120] takes as input a data parallel program [110], without distribution specifications, and adds program statements to read and implement regular data distributions. When the target language is High Performance Fortran, the source program happens to be a restricted form Fortran 90 program.

The input data file [128] for a specific problem is supplied by the user, who is not necessarily the same person as the programmer. The problem topology descriptions, in the input for the program, are of fundamental importance.

The machine description [124] is ideally provided by the machine manufacturer or the systems administrator. It is used for all composite grid application distributions.

An understanding of the computation associated with each mesh in the simulation is needed for layout determination. This information may be obtained from the user and/or programmer [112], the transformation method via an interprocedural analysis [118], or the compiler via an interprocedural analysis during the compilation of the parallel program resulting from the transformation method [122]. For example, the user can specify the type of mesh, e.g., a pipe in a water-cooled nuclear reactor simulation, and the programmer can specify the type computation associated with each type of mesh, e.g., a pipe or pump. In the following section, this information is assumed to be provided by the user and/or programmer and included with the input of the user specification of problem topology as part of the problem description [116]. This assumption is reasonable as most composite grid applications have at most a few types of meshes and their computations can be profiled in the application to provide these statistics for all users of the application. The reference patterns in the computation determine the communication needed and hence the discussion of obtaining communication measures is similar.

Data distribution [114] may be performed concurrently with program transformation [120]. Data distribution uses the problem description [116] (composed of the program input and the computation and communication measures) and the machine description [124] (based on the target parallel machine) to determine a full data distribution specification [126]. The distribution specification [126] tells how to map the data onto the parallel computer [134].

Associated with the high-level data parallel language, is an efficient compiler [130] for communication generation, optimization, and standard code generation. An example of such a compiler is described in U.S. Pat. No. 5,355,492, incorporated herein by reference. Optimally, the compiler must separately compile program modules, do interprocedural analysis, and perform optimizations based on symbolic (runtime) constants. The compilation [130] results in an executable program [132], taking as input the user provided application input file [128] and the data distribution specification [126]. This executable program [132] runs on the parallel computer [134].

In FIG. 1a, the flowchart from FIG. 1 is made specific with a concrete example. The computation and communication measures are provided with the application program via path [112]. This allows an explicit expression of the highest level of parallelism. Each shaded block represents a separate computer. Each computer is performing the process shown overlaying the computer in the figure, except that the executable program [132] is run on the parallel computer [134]. The workstations [136, 138, 140] are all high performance computers ($\geq$200 MHz) with large memories ($\geq$64M). (Alternatively, as previously discussed, [136, 138] could also be parallel computers.) The application program [110] is pipelined between program transformation [120] and program compilation [130], with communication proceeding along a channel [142]. Finally, a distributed memory, 2-dimensional mesh topology machine with 12 processors is presented as a concrete example of a parallel machine [134].

Figure 1B:
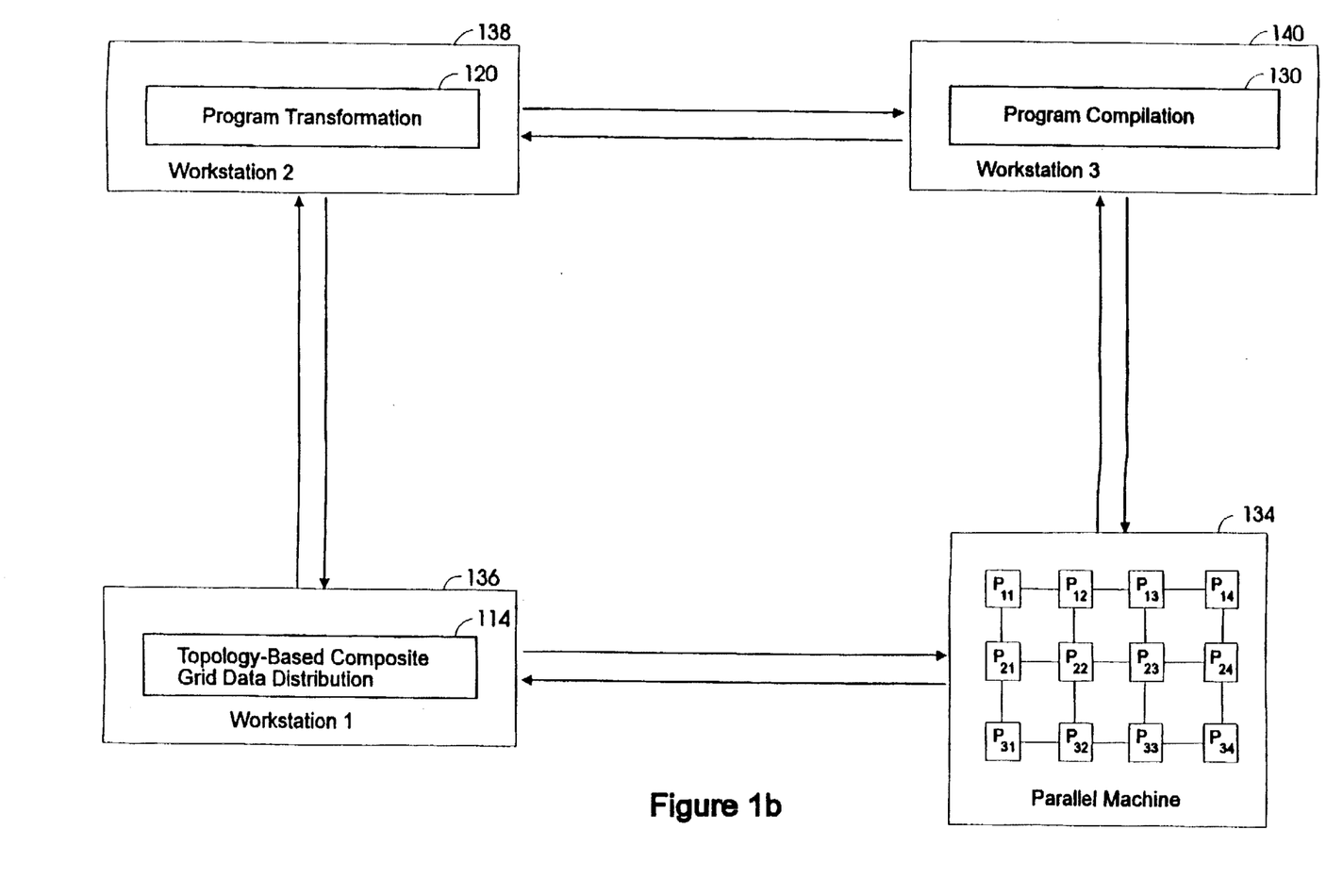
FIGS. 1b and 1c illustrate two possible interconnection networks for the processors in the environment.
Figure 1C:
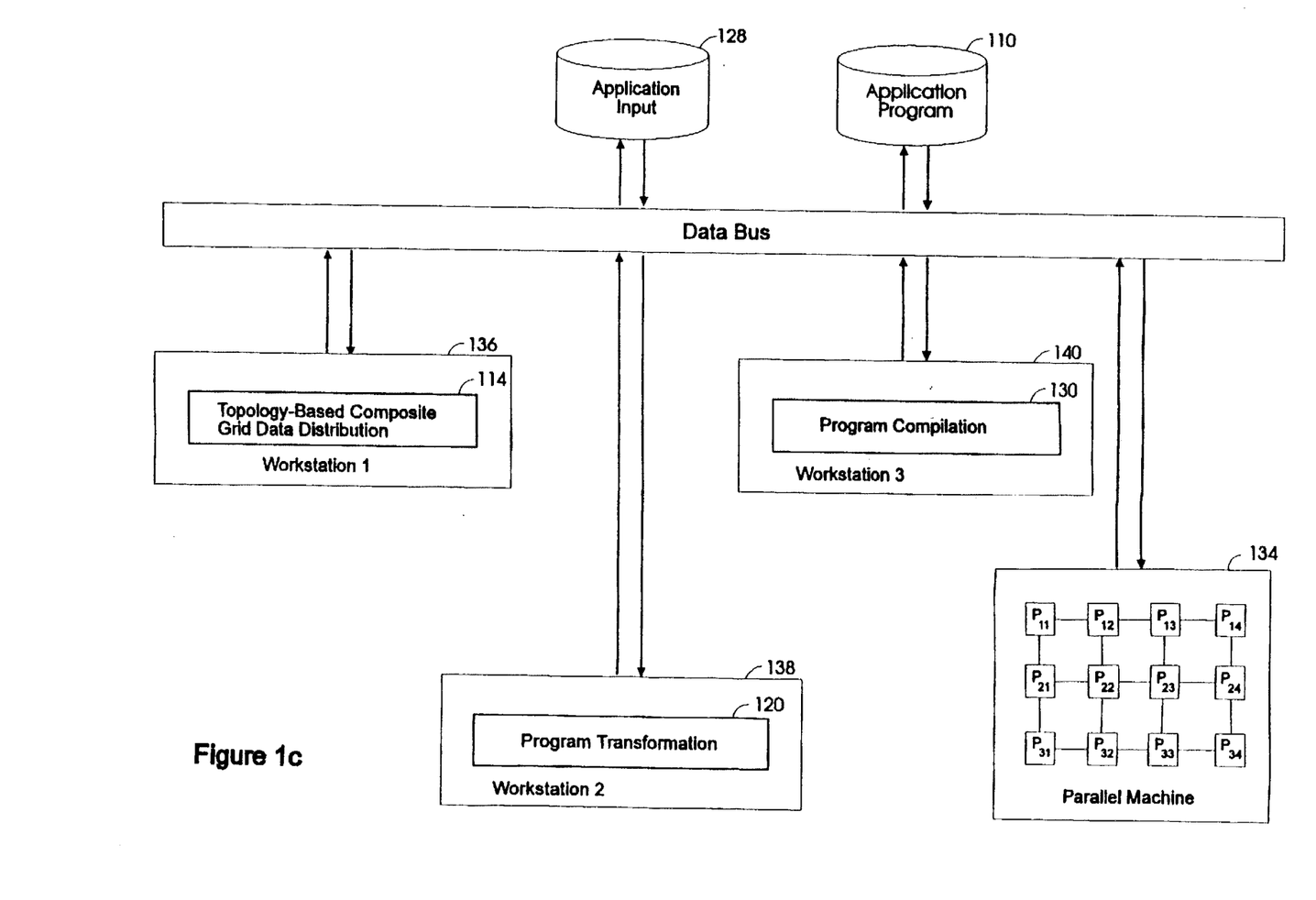

FIGS. 1b and 1c are block diagrams illustrating additional embodiments of the multi processor parallel computer architecture. In both Figures, the computers are configured as multiple instruction multiples data (MIMD) multiprocessors. Further, each processor includes its own local storage. In FIG. 1b, the computer architecture is arranged such that the workstations and the parallel machine are all arranged in a parallel manner, wherein only adjacent components communicate directly with each other. In FIG. 1c, the hardware configuration includes global storage in addition to the local processor storage. The details of these forms of computer architectures are disclosed in greater detail in, for example, U.S. Pat. No. 5,163,131, Boxer, A., Where Buses Cannot Go, IEEE Spectrum, February 1995, pp. 41–45; and Barroso, L. A. et al., RPM: A Rapid Prototyping Engine for Multiprocessor Systems, IEEE Computer February 1995, pp. 26–34, all of which are incorporated herein by reference. Other architectures may be utilized as well. For example, the cross-point computer architecture is also particularly useful and beneficial in connection with the present invention. This architecture is discussed in Boxer, Where Buses Cannot Go.

In FIG. 2, the data distribution method [114] is expanded to show how information flows through the components of this process. The problem description [116] and machine description [124] are used to classify meshes [210] into three categories: small [212], medium [214], and large [218]. The medium meshes [214] are packed [216] to create packed meshes [220]. Using the machine description [124], data distributions [224] are found [222] for the large meshes [218] and the packed meshes [220]. Finally, the load balance imposed by the large mesh distributions [imposed by 224] is used to determine mapping [226] of small meshes [212]. This step [114] results in full data distribution specifications [228].

In FIG. 3, the packing of meshes [216] is expanded to show the major steps of this part of the process. The minimum size for large meshes [310] is used to determine [312] the maximum number of bins in which to pack the medium size meshes [214]. Given this upper bound on bins, the medium meshes [214] are packed [314] into bins. Next the bins are converted [316] into large size meshes. Finally, the couplings involving the medium size meshes are updated [318] to reflect the packed locations. This step [216] results in packed (large) meshes [220].

In FIG. 4, large mesh distribution [222] is expanded to show the major steps in this part of the process. The machine description [124] is used to select [410] all valid processor topology candidates. Using the set of candidates, the large meshes [218], and the packed meshes [220], tables of predicted performance are generated [412] for each of the meshes and all candidates. The global runtime is minimized [414] by selecting the processor topology candidate with minimum predicted runtime for all meshes. Finally, the meshes are shifted and folded around the processor topology to reduce [416] communication. This step [222] results in full specification of distribution for all large (including packed) meshes [224].

In FIG. 5, small mesh mapping [226] is expanded to show the steps in this part of the process. The small size meshes [212] and large mesh distributions [224] are used to schedule [510] the large to small mesh couplings. Given these couplings, a small mesh, M, is selected [512] for mapping. Based on the scheduled communication, a processor, P, is selected [514] for the small mesh. If processor P has room [520] for mesh M, then mesh M is mapped [524] onto processor P. If there is not room [520] for mesh M on processor P, another processor must be found. This sidetrack will be discussed shortly. After a mesh is mapped [524] onto a processor, all of its unscheduled coupling must be scheduled [528]. If there are more meshes [534] to consider, then the next mesh must be selected [512].

Returning to the situation where there is not room [520] for mesh M on the selected processor, P, the steps to find another processor are as follows. If there is room [518] for mesh M on a processor that neighbors P, then P is set [522]

to be the neighbor and mesh M is mapped [524] onto processor P. Otherwise, if there is an empty [516] processor, then P is set [526] to be the empty processor and mesh M is mapped [524] onto processor P. Otherwise, if mesh M is relatively large, then P is set [532] to be the least full processor and mesh M is mapped [524] onto processor P. Otherwise, mesh M is set aside [532] as a filler mesh for the final load balance phase of the process and if there are more meshes [534] to consider, then the next mesh must be selected [512]. When there are no more small meshes [534] to consider, filler meshes are dealt with. If there is a filler mesh [538] to map, the largest (by total computation) filler mesh is mapped [540] to the least computationally full processor. This step is repeated until there are no more filler meshes to map. This phase of the method [226] results in full distribution specifications for all meshes in the problem [228].

In FIG. 6, program transformation [120] is expanded to show the major steps in this part of the process. Transformation works on the application program [110]. The declarations of UDTs are modified [610] to include storage for distribution specifications and to convert all distributed arrays to pointers to distributed arrays. The input routine is modified [612] to include the distribution specifications as part of the input. Storage allocation routines are also modified [614]. A "processors statement" is added [616] to the main routine. All subroutines, with UDT parameters having distributed data, are cloned for each possible distribution and modified [618] to reflect the use of the elements of the UDT in the parameter list. Similarly, all calls to these same subroutines are modified [620]. This step [120] results in a transformed (distribution specifications are added) program [622].

While the invention has been particularly shown and described with reference to preferred embodiments, it will be understood by those skilled in the art that various changes in form and details may be made without departing from the spirit and scope of the invention.

I claim:

1. A computer-implemented method of automating data layout for parallelization of composite grid problems, based on problem topology and machine topology, having physical quantities using a parallel machine having parallel processors, comprising the steps of:
   (a) classifying the physical quantities into one of all small meshes each to be executed substantially by one of the parallel processors, all medium meshes each to be executed by a subset of the parallel processors, or a combination of at least two of large, medium, and small meshes, the large mesh being executed substantially across all of the parallel processors;
   (b) generating a data distribution responsive to a combination of at least two of the meshes as classified in step (a) and the problem and machine topology; and
   (c) executing an application program using the data distribution generated in step (b).

2. A computer-implemented method according to claim 1, wherein the problem topology description includes:
   (i) number of meshes in the problem;
   (ii) for each mesh in the problem,
      number of dimensions,
      number of elements in each dimension,
      amount of communication in each dimension, and
      amount of computation in each element;
   (iii) for each coupling between meshes,
      identification of the coupled elements,
      amount of communication between each pair of coupled element; and
   (iv) preferred number of processors to use.

3. A computer-implemented method according to claim 1, wherein the machine topology description includes:
   (i) maximum number of processors available on the system;
   (ii) available processor topologies; and
   (iii) measures of the computation and communication rates.

4. A computer-implemented method according to claim 1, wherein the parallel machine comprises processors, and wherein when a user requests more processors to be used in connection with said method than the processors in the parallel machine, said method further comprises the step of providing the user with at least one of the following options:
   (i) continuing with a reduced set of processors,
   (ii) aborting the distribution process, and
   (iii) completing the process resulting in a data layout not compatible with the current configuration.

5. A computer-implemented method according to claim 1, wherein said distribution step (a) further comprises the step of packing the medium mesh in accordance with the following steps:
   (a1) determining how many bins to be used while maintaining a sufficiently large mesh for distribution over all processors;
   (a2) packing meshes into bins via at least one of a nonlinear optimization, a local linear optimization, and heuristics;
   (a3) converting the bins into new large meshes; and
   (a4) updating medium mesh couplings for the new large meshes.
   (a5) modifying the medium mesh couplings to include communication with elements in the new large mesh, completing full topology and coupling specification for the new large meshes.

6. A computer-implemented method according to claim 1, wherein said distribution step (b) further comprises the step of performing a small mesh mapping in accordance with the following steps:
   (a1) selecting a small mesh to map;
   (a2) determining a processor on which to place the small mesh;
   (a3) mapping the small mesh onto the processor; and
   (a4) scheduling couplings between the small mesh mapped in step (a3) and unmapped meshes.

7. A computer-implemented method according to claim 1, further comprising the step of transforming the application program without requiring the user to generate and maintain clones of subroutines for each valid data distribution.

8. A computer-implemented method according to claim 1, wherein the parallelization of the composite grid problems is based on the problem topology and the machine topology having the combination of a topology-based composite grid data distribution, and wherein the parallelization is further based on using the problem topology to express parallelism across an entire problem domain for simulation execution, and not one vector at a time.

9. A computer-implemented method according to claim 1, wherein the parallelization of the composite grid problem supports parallelism across multiple coupled grids.

10. A computer-implemented method according to claim 1, wherein the composite grid problem includes at least one grid, and wherein the at least one grid is assigned to at least one processor.

11. A computer-implemented method according to claim 1, wherein the composite grid problem includes at least one grid, and the at least one grid is treated as an entity that can be distributed across all processors in the parallelization, or distributed over a strict subset of the processors.

12. A computer-implemented method according to claim 1,
wherein the composite grid problem includes grids, and the problem topology includes connectivity of the grids, and
wherein the computer-implemented method uses the connectivity expressed in the problem topology to determine a data distribution that maximizes parallelism across computations for all of the grids substantially at the same time.

13. A computer-implemented method according to claim 1, wherein the parallelization of the composite grid problems is based on the problem topology and the machine topology having the combination of a topology-based composite grid data distribution, and wherein the parallelization is further based on using the problem topology to distribute arrays onto processing elements to maximize parallelism and to minimize communication during parallel computation.

14. A computer-implemented method according to claim 1,
wherein the composite grid problem includes grids, and
wherein different grids reside on different processors and have associated computations performed in parallel.

15. A computer-implemented method according to claim 1,
wherein the composite grid problem includes grids, and the problem topology includes connectivity of the grids, and
wherein the computer-implemented method uses the connectivity to include interactions inside each grid and interactions between connected grids, and the problem connectivity is not restricted to interactions over a single uniform structure.

16. A computer-implemented method according to claim 1, wherein said generating step (b) further comprises the step of converting a parallel program that does not specify the data distribution into another parallel program that reads in another data distribution and uses the another data distribution during said execution step (c).

17. A computer-implemented method according to claim 16, wherein the parallel program includes vector instructions.

18. A computer-implemented method according to claim 1, wherein when a user requests more processors to be used in connection with said method than the parallel processors in the parallel machine, said method further comprises the step of providing the user with at least one of the following options:
(i) continuing with a reduced set of processors,
(ii) aborting the distribution process, and
(iii) completing the process resulting in a data layout not compatible with the current configuration.

19. A computer-implemented method of automating data layout for parallelization of composite grid problems, based on problem topology and machine topology, having physical quantities, comprising the steps of:
(a) receiving an application program, a problem description including predetermined parallelism, computation and communication measures for data distribution, types of meshes, computation and communication associated with each of the meshes, and a machine description;

(b) transforming the application program for implementing the data distribution into a transformed program;
(c) performing the data distribution responsive to the problem and machine descriptions including a combination of at least two meshes coupled directly or indirectly to each other, and the application program generating a data distribution specification responsive thereto;
(d) compiling the transformed program into an executable program responsive to the problem description and the data distribution specification; and
executing the compiled program on a parallel machine.

20. A computer architecture for automating data layout for parallelization of composite grid problems, based on problem topology and machine topology, having physical quantities, comprising:
a program transformation workstation transforming an application program for implementing a data distribution into a transformed program;
a topology-based composite grid data distribution workstation performing the data distribution responsive to problem and machine descriptions including a combination of at least two meshes coupled directly or indirectly to each other, and the application program generating a data distribution specification responsive thereto;
a program compilation workstation responsively coupled to said program transformation workstation, and compiling the transformed program into an executable program responsive to the problem description and the data distribution specification; and
a parallel machine responsively coupled to said topology-based composite grid data distribution workstation and said program compilation workstation, executing the compiled program.

21. A computer architecture used in automating data layout for parallelization of composite grid problems, based on problem topology and machine topology, having meshes, comprising:
means for generating a data distribution responsive to a combination of at least two meshes coupled directly or indirectly to each other and the problem and machine topologies; and
means for executing an application program responsive to the data distribution.

22. A computer architecture used in automating data layout for parallelization of composite grid problems, based on problem topology and machine topology, having meshes, comprising:
a workstation classifying the meshes into one of all small meshes each to be executed substantially by one of parallel processors, all medium meshes each to be executed by a subset of the parallel processors, or a combination of at least two of large, medium, and small meshes, the large mesh being executed substantially across all of the parallel processors, and generating a data distribution responsive to a combination of at least two of the meshes and the problem and machine topologies; and
a parallel machine including the parallel processors, responsively coupled to said workstation, executing an application program responsive to the data distribution.

23. A computer-implemented method of automating data layout for parallelization of composite grid problems, based on problem topology and machine topology, having meshes, comprising the steps of:

(a) generating a data distribution responsive to a combination of at least two meshes coupled directly or indirectly to each other and the problem and machine topologies; and (b) executing an application program responsive to said generating step (a).

24. A computer-implemented method according to claim 23, wherein the problem topology description includes:
(i) number of meshes in the problem;
(ii) for each mesh in the problem,
   number of dimensions,
   number of elements in each dimension,
   amount of communication in each dimension, and
   amount of computation in each element;
(iii) for each coupling between meshes,
   identification of the coupled elements,
   amount of communication between each pair of coupled element; and
(iv) preferred number of processors to use.

25. A computer-implemented method according to claim 23, wherein the machine topology description includes:
(i) maximum number of processors available on the system;
(ii) available processor topologies; and
(iii) measures of the computation and communication rates.

26. A computer-implemented method according to claim 23, further comprising the step of transforming the application program without requiring the user to generate and maintain clones of subroutines for each valid data distribution.

27. A computer-implemented method according to claim 23, wherein the parallelization of the composite grid problems is based on the problem topology and the machine topology having the combination of a topology-based composite grid data distribution, and wherein the parallelization is further based on using the problem topology to express parallelism across an entire problem domain for simulation execution, and not one vector at a time.

28. A computer-implemented method according to claim 23, wherein the parallelization of the composite grid problem supports parallelism across multiple coupled grids.

29. A computer-implemented method according to claim 23, wherein the composite grid problem includes at least one grid, and wherein the at least one grid is assigned to at least one processor.

30. A computer-implemented method according to claim 23, wherein the composite grid problem includes at least one grid, and the at least one grid is treated as an entity that can be distributed across all processors in the parallelization, or distributed over a strict subset of the processors.

31. A computer-implemented method according to claim 23,
   wherein the composite grid problem includes grids, and the problem topology includes connectivity of the grids, and
   wherein the computer-implemented method uses the connectivity expressed in the problem topology to determine a data distribution that maximizes parallelism across computations for all of the grids substantially at the same time.

32. A computer-implemented method according to claim 23, wherein the parallelization of the composite grid problems is based on the problem topology and the machine topology having the combination of a topology-based composite grid data distribution, and wherein the parallelization is further based on using the problem topology to distribute arrays onto processing elements to maximize parallelism and to minimize communication during parallel computation.

33. A computer-implemented method according to claim 23,
   wherein the composite grid problem includes grids, and
   wherein different grids reside on different processors and have associated computations performed in parallel.

34. A computer-implemented method according to claim 23,
   wherein the composite grid problem includes grids, and the problem topology includes connectivity of the grids, and
   wherein the computer-implemented method uses the connectivity to include interactions inside each grid and interactions between connected grids, and the problem connectivity is not restricted to interactions over a single uniform structure.

35. A computer-implemented method according to claim 23, wherein said generating step (a) further comprises the step of converting a parallel program that does not specify the data distribution into another parallel program that reads in another data distribution and uses the another data distribution during said execution step (b).

* * * * *